United States Patent
Xie et al.

(10) Patent No.: US 8,443,380 B2
(45) Date of Patent: May 14, 2013

(54) WEB SERVICES LAYER SYNCHRONY IN RELATION TO THE BUSINESS LAYER SYNCHRONY

(75) Inventors: Nan Xie, Fremont, CA (US); Vebhhav Singh, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 38 days.

(21) Appl. No.: 13/052,040

(22) Filed: Mar. 18, 2011

(65) Prior Publication Data

US 2011/0167432 A1      Jul. 7, 2011

Related U.S. Application Data (63) Continuation of application No. 11/080,210, filed on Mar. 14, 2005, now Pat. No. 7,930,702.

(51) Int. Cl.
*G06F 9/44* (2006.01)
*G06F 9/54* (2006.01)

(52) U.S. Cl.
USPC .......................................... 719/315; 719/330

(58) Field of Classification Search ....................... None
See application file for complete search history.

(56) References Cited

U.S. PATENT DOCUMENTS

| | | | |
|---|---|---|---|
| 7,930,702 B2 | 4/2011 | Xie et al. | |
| 2003/0061404 A1 | 3/2003 | Atwal et al. | |
| 2005/0044197 A1 | 2/2005 | Lai | |
| 2005/0063335 A1 | 3/2005 | Shenfield et al. | |
| 2005/0125508 A1 | 6/2005 | Smith et al. | |
| 2005/0144277 A1 | 6/2005 | Flurry et al. | |
| 2005/0234928 A1 | 10/2005 | Shkvarchuk et al. | |

OTHER PUBLICATIONS

Non-Final Office Action for U.S. Appl. No. 11/080,210, mailed on May 13, 2008, 13 pages.
Final Office Action for U.S. Appl. No. 11/080,210, mailed on Nov. 12, 2008, 13 pages.
Non-Final Office Action for U.S. Appl. No. 11/080,210, mailed on Apr. 14, 2009, 14 pages.
Non-Final Office Action for U.S. Appl. No. 11/080,210, mailed on Feb. 22, 2010, 15 pages.
Final Office Action for U.S. Appl. No. 11/080,210, mailed on Aug. 30, 2010, 15 pages.
Notice of Allowance for U.S. Appl. No. 11/080,210, mailed on Dec. 14, 2010, 3 pages.

*Primary Examiner* — H. S. Sough
*Assistant Examiner* — Kimberly Jordan
(74) *Attorney, Agent, or Firm* — Kilpatrick Townsend & Stockton LLP (57) ABSTRACT

A web services system provides web services interfaces to applications having native interfaces with different types of synchrony. The web services interfaces can have the same or different type of synchrony than the underlying application. The web services layer translates a web services request from a client to corresponding function calls to applications. Upon receiving a response from an application, the web services layer translates the response back to a web services format and forwards it to the client. A naming convention is used to define the names of the data types and operations in the web services interface corresponding with data types and functions of the application. A function prefix can be used to specify a namespace in the web services interface unique to the application. A web services namespace is assigned to tokens so that requests for asynchronous web services are diverted to a general web services routine.

18 Claims, 5 Drawing Sheets

WEB SERVICES LAYER SYNCHRONY IN RELATION TO THE BUSINESS LAYER SYNCHRONY

CROSS-REFERENCES TO RELATED APPLICATIONS

The present application is a continuation of U.S. application Ser. No. 11/080,210, filed Mar. 14, 2005, and entitled Web Services Layer Synchrony in Relation to the Business Layer Synchrony, the entire contents of which are herein incorporated by reference for all purposes.

BACKGROUND OF THE INVENTION

The invention relates to the field of computer software, and specifically to providing interfaces between software applications. Software applications are used by businesses to perform a variety of different tasks. Often, businesses have one or more proprietary software applications to store, process, and retrieve data. Client applications can access these software applications and their data using proprietary application programming interfaces (APIs) and messaging.

Applications typically communicate data with clients using one of two types of synchrony: synchronous or asynchronous. In synchronous applications, data is processed in line with client requests. Applications receive data processing requests from client applications and attempt to process them as soon as possible. Any data processing results are typically returned to the clients as soon as they are available. While its data processing requests are pending, the client typically enters a blocked or wait state. In asynchronous applications, data processing requested are queued or otherwise scheduled for processing at a later time. For example, an asynchronous application may queue all of the client requests received during a business day and begin processing these requests at night. A typical asynchronous application returns a token to a client application in response to a client request. The client application can then present this token to the asynchronous application at a later time to retrieve the data processing results.

Web services have evolved to standardize the interfaces for accessing these applications and to integrate their data. Web services applications incorporate a variety of different technologies to achieve these goals, such as XML for describing data; WSDL for describing web services application interfaces; SOAP for communicating with web services applications; and UDDI for locating web services applications. Although web services applications can be standalone applications tailored to use these web services technologies, it is often desirable to integrate older, or legacy, applications into web services systems. One way of accomplishing this is to provide a web services layer that translates an application's proprietary API to a web services interface capable of being used by any web services client application.

One difficulty with integrating applications with a web services layer is that applications may be synchronous or asynchronous. As a result, the web services layer must be able to integrate with either type of application. Furthermore, web services applications must be able to integrate two or more different applications having different types of synchrony. Additionally, web services clients may require a different type of synchrony than that provided by the underlying application. However, to maintain compatibility, a web services system may be required to maintain an application's original API for older client applications. Prior web services layers merely mirrored the underlying application API and thus cannot change the synchrony of an application's interface, cannot readily integrate applications having different types of synchrony, and cannot provide multiple application interfaces with different types of synchrony for applications only having one type of synchrony.

It is therefore desirable for a system and method to enable a web services layer to interface with both synchronous and asynchronous applications. It is further desirable for the web services system to provide either synchronous and/or asynchronous web services interfaces to client applications regardless of the type of synchrony required of the underlying application. It is also desirable for the web services system to allow synchronous and asynchronous web services interfaces to be easily created or modified for either type of underlying application programming interface. Additionally, it is desirable for the web services layer to efficiently convert client requests between interfaces with different types of synchrony.

BRIEF SUMMARY OF THE INVENTION

An embodiment of the invention includes web services system provides web services interfaces to applications having native interfaces with different types of synchrony. The web services interfaces can have the same or different type of synchrony than the underlying application. The web services layer translates a web services request from a client to corresponding function calls to applications. Upon receiving a response from an application, the web services layer translates the response back to a web services format and forwards it to the appropriate client. A naming convention is used to define the names of the data types and operations in the web services interface corresponding with data types and functions of the application. A function prefix can be used to specify a namespace in the web services interface unique to the application. A web services namespace is assigned to tokens so that requests for asynchronous web services are diverted to a general web services routine.

In an embodiment, a system for interfacing an application with at least one client includes a first interface adapted to receive a web services request from a client for an application. The first interface has a first type of synchrony. A second interface is adapted to invoke one at least one function of the application corresponding with the web services request. The second interface has a second type of synchrony. A translation layer is adapted to match the web services request with the corresponding function of the application using a namespace associated with the web services request to identify the application.

In another embodiment, the translation layer is further adapted to derive the name of the function of the application from a name associated with the web services request using a naming convention. In still another embodiment, the first and second types of synchrony can each be synchronous or asynchronous.

In an embodiment, the first type of synchrony is asynchronous and the second type of synchrony is synchronous, and the translation layer is further adapted to designate a location for a result of the corresponding function, to generate a token indicating the location, to communicate the token to the client, to store the result in the location, and to communicate the result to the client. In a further embodiment, the translation layer is further adapted to communicate the result to the client in response to receiving the token in association with a second web services request from the client. In an embodiment, the token is associated with a system namespace and the system is adapted to divert the web services request to a general processing routine of the translation layer in response to receiving a web services request associated with a token.

Another embodiment of the system includes an interface directory adapted to store a specification of at least one function of the application, wherein the specification includes a synchrony type and a web services interface generator adapted to create a web services description document from the specification. The web services description document defines a web services request corresponding to the function.

BRIEF DESCRIPTION OF THE DRAWINGS

The invention is described with reference to the drawings, in which.

DETAILED DESCRIPTION OF THE INVENTION

Figure 1:
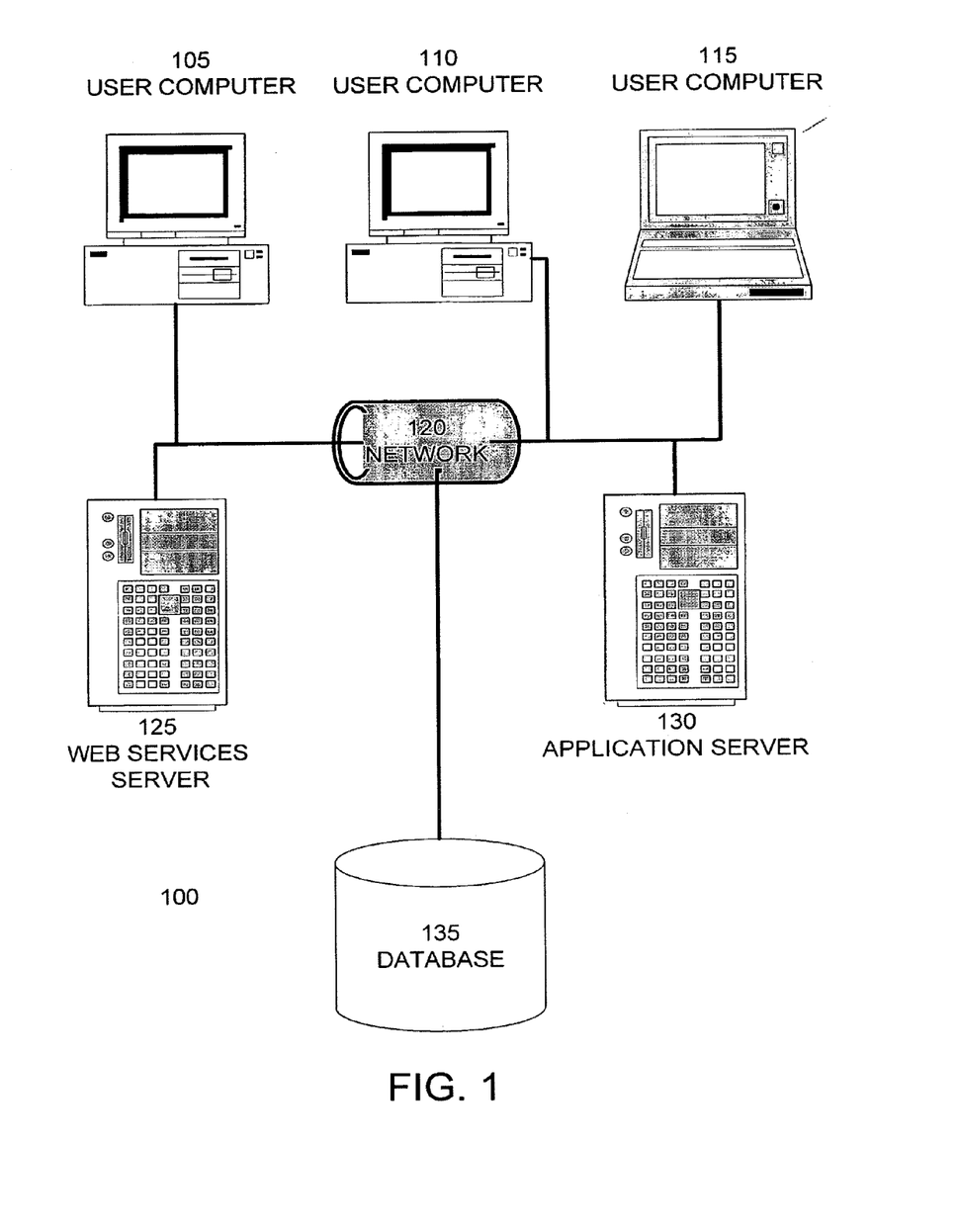
FIG. 1 is a block diagram of a system for implementing an embodiment of the invention.

FIG. 1 is a block diagram of a system 100 for implementing an embodiment of the invention. System 100 includes user computers 105, 110, and 115. User computers 105, 110, and 115 can be general purpose personal computers having web browser applications or other client applications. Alternatively, user computers 105, 110, and 115 can be any other electronic device, such as a thin-client computer, Internet-enabled mobile telephone, or personal digital assistant, capable of displaying and navigating web pages or other types of electronic documents. Although system 100 is shown with three user computers, any number of user computers can be supported.

A web services server 125 is used to process requests for web services applications, web pages or other electronic documents from user computers 105, 110, and 115. In an embodiment, web services applications are operated by the web services server 125. In an embodiment of the invention, web services applications communicate with applications on user computers.

Application server 130 operates one or more data applications. In an embodiment, the application server 130 is one or more general purpose computers capable of executing programs or scripts in response to the user computers 105, 110 and 115. The data applications and web services applications can be implemented as one or more scripts or programs written in any programming language, such as Java™, C, or C++, or any scripting language, such as Perl, Python, or TCL.

The data applications on application server 130 and the web services applications on web services server 125 process input data and user computer requests and can store or retrieve data from database 135. Database 135 stores data created and used by the enterprise. In an embodiment, the database 135 is a relational database, such as Oracle 9i, that is adapted to store, update, and retrieve data in response to SQL format commands.

An electronic communication network 120 enables communication between computers 105, 110, and 115, web services server 125, application server 130, and database 135. In an embodiment, network 120 may further include any form of electrical or optical communication devices, including wireless and wired networks. Network 130 may also incorporate one or more local-area networks, such as an Ethernet network; wide-area networks, such as the Internet; and virtual networks, such as a virtual private network.

The system 100 is one example for executing data applications according to an embodiment of the invention. In another embodiment, application server 130, web services server 125, and optionally database 135 are server applications that can be executed on the same server computer system or multiple server computers. In alternate embodiment, all or a portion of the web application functions may be integrated into an application running on each of the user computers. For example, a Java™ or JavaScript™ application on the user computer is used to retrieve or analyze data and display portions of the data analysis application.

Figure 2:
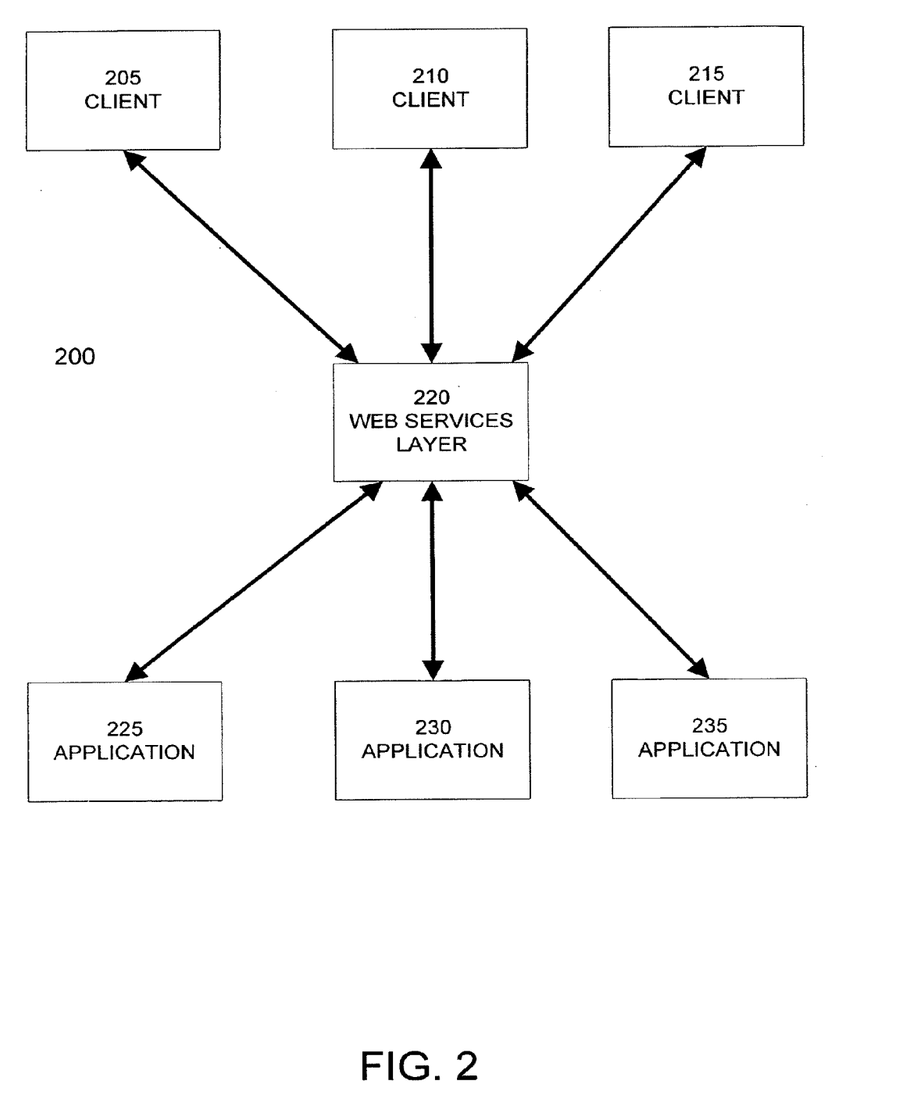
FIG. 2 is a block diagram of a web services system according to an embodiment of the invention.

FIG. 2 is a block diagram of a web services system 200 according to an embodiment of the invention. Web services system 200 includes one or more client applications, such as clients 205, 210, and 215. The client applications are adapted to interface with web services layer 220.

In an embodiment, the web services layer 220 and the clients 205, 210, and 215 incorporate a variety of different technologies to request operations and communicate data, such as XML for describing data; WSDL for describing web services application interfaces; SOAP for communicating with web services applications; and UDDI for locating web services applications.

Web services layer 220 is adapted to interface with clients, such as 205, 210, via a web services interface and 220, and with one or more applications, such as 225, 230, and 235. The applications can be adapted to store, retrieve, and/or process data. Furthermore, each application is adapted to communicate with one or more non-web services clients (omitted for clarity from FIG. 2) via its own application programming interface (API). An application's API can be a standardized interface or proprietary to the application.

The web services layer 220 is adapted to receive client requests from the clients 205, 210, and 215 via the web services interface. For each client request, the web services layer 220 translates the request to one or more corresponding API calls to one or more of the applications 225, 230, and 235. Upon receiving a response from an application, if any is generated, the web services layer 200 translates the response back to a web services format and forwards it to the appropriate client. In an embodiment, the web services layer is implemented using Java ServiceBeans, which are similar to the Java Beans used by J2EE-compliant systems.

The web services layer 220 can provide both web services interfaces to clients that are both synchronous and asynchronous. As discussed below, the type of synchrony used in a web services interface provided by the web services layer 220 is independent of the type of synchrony used by the underlying applications.

Figure 3:
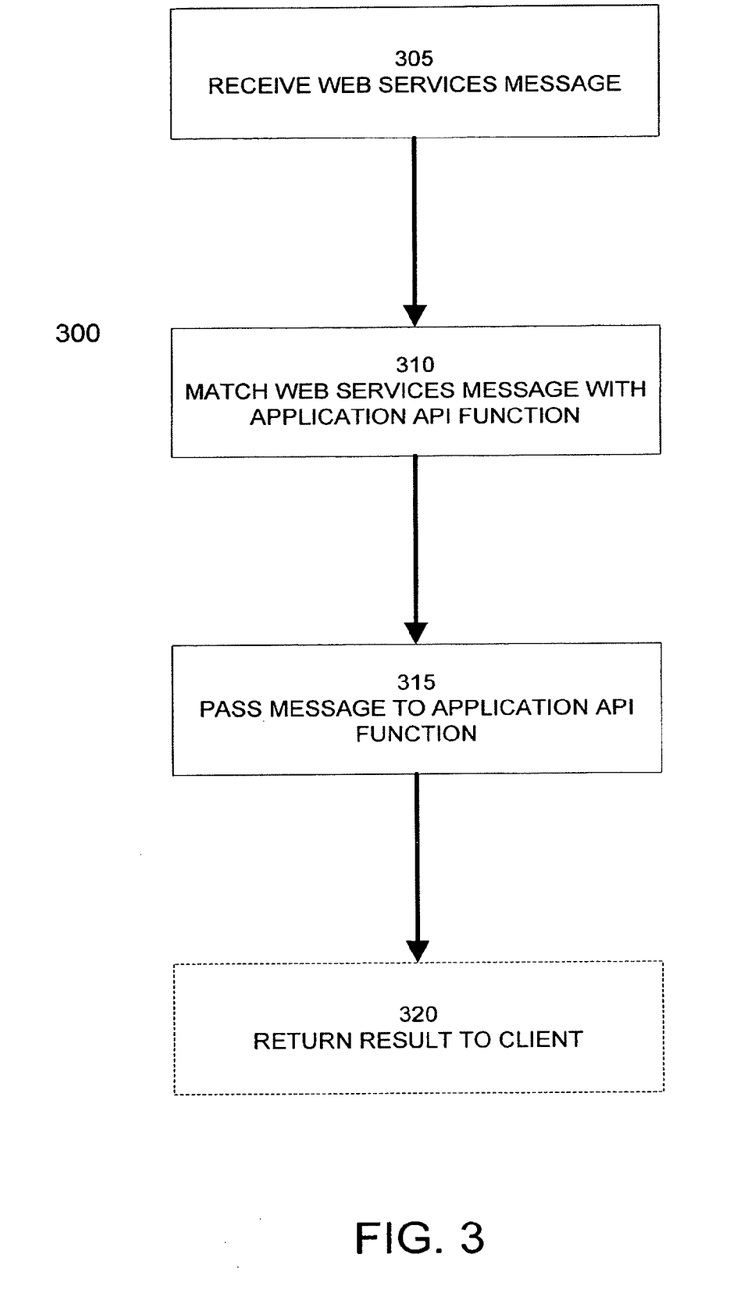
FIG. 3 is a flowchart illustrating a method of a web services layer according to an embodiment of the invention.

In a synchronous web services interface, document processing is performed in line by the web services layer. FIG. 3 is a flowchart illustrating a method 300 of a web services layer according to an embodiment of the invention. At step 305, a web services layer receives a web services request. The web services request can include data associated with the request, for example in the form of an XML-formatted document. At step 310, the web services layer matches the web services request with one or more corresponding API functions of one or more applications. At step 315, the web services layer invokes the matching API functions, optionally including data from the web services request. In a further embodiment of this step, the web services layer translates data associated with a web services request into one or more data formats required by the matching API functions. The applications perform one or more operations as specified by the invoked API functions and optionally return data results to the web services layer. Upon receiving data results, if any, from one or more applications, in optional step 320 the web services layer returns these data results to the web services client. In a further embodiment, the web services layer translates data results received from one or more applications into a web services data format, such as an XML-formatted document.

Figure 4:
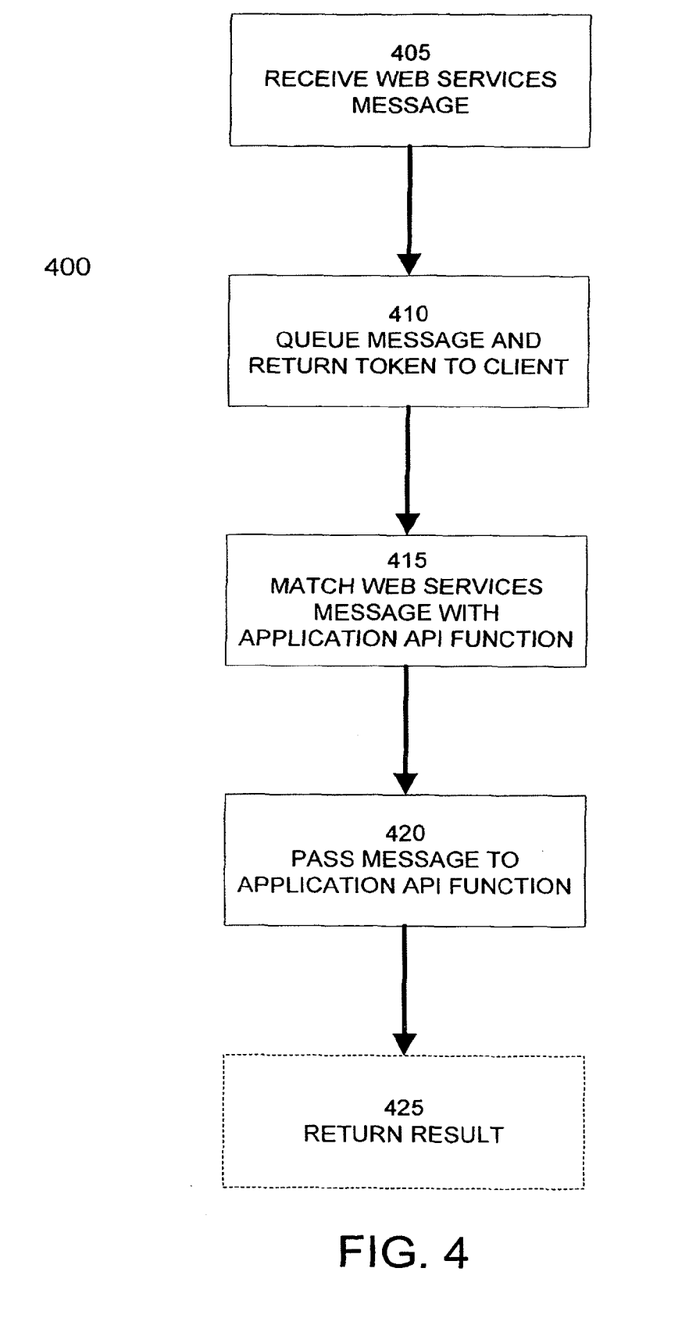
FIG. 4 is a flowchart illustrating a method of a web services layer according to an embodiment of the invention.

In an asynchronous web services interface, document processing is performed offline by the web services layer. FIG. 4 is a flowchart illustrating a method 400 of a web services layer according to an embodiment of the invention. At step 405, the web services layer receives a web services request from a client. The web services request can include data associated with the request, for example in the form of an XML-formatted document. At step 410, the web services layer enqueues the web services request in a queue, buffer, or other data structure, which may also be used to hold other pending web services requests from one or more clients. In a further embodiment, the web services layer augments the web services request, for example by adding new data fields or formatting data, and enqueues the modified web services request. The web services layer also returns a token to the client in response to the request. The token uniquely identifies the pending web services request. In an embodiment, the token can include information such as a request ID number, a status message, and/or a time of receipt associated with the web services request.

At some point following the receipt of the web services request, in step 415 the web services layer matches the web services request with one or more corresponding API functions of one or more applications. In step 420, the web services layer invokes the matching API functions, optionally including data from the web services request. The web services layer can invoke API functions for each pending web services request separately or can combine two or more web services requests into a batch request. Additionally, application API functions can be invoked by the web services layer according to a previously determined schedule or according to the availability of the associated application.

In a further embodiment, the web services layer translates data associated with a web services request into one or more data formats required by the matching API functions. In another embodiment of step 420, an application initiates the retrieval of web services requests from the web services layer and invokes the appropriate functions automatically. In this embodiment, the application can invoke API functions for each pending web services request separately or can combine two or more web services requests into a batch request. Additionally, web services requests can be retrieved by the application from the web services layer according to a previously determined schedule or according to the availability of the associated application.

The applications perform one or more operations as specified by the invoked API functions and optionally return data results, if any, to the web services layer. In optional step 425, the web services layer translates data results received from one or more applications into a web services data format, such as an XML-formatted document. Upon receiving data results from one or more applications, in an embodiment of step 425 the web services layer returns these data results to the web services client. In another embodiment of step 425, the web services layer stores the data results in a queue, buffer, or other data structure. The client can then present its token to the web services layer to retrieve the data results.

Upon receiving a token from a client, in an embodiment of step 425 the web services layer retrieves the data results from the location specified by the token. In a further embodiment, each token issued by the web services layer is associated with a unique location in the queue, buffer, or other data structure. A pending web services request is stored in the location specified by its corresponding token. Upon receiving data results from an application, the web services layer stores the data results in the same or an equivalent location as its associated web services request. An equivalent location can be a different queue, buffer, or other data structure than that used to store its associated web services request; however, the same or an equivalent token may be used in storing the data results.

In the web services system 200, there are two separate layers of synchrony. First, applications can have synchronous or asynchronous APIs. Second, the web services layer can provide a synchronous or asynchronous web services interface. Thus, in this embodiment, there are four different combinations of synchrony: 1) a synchronous web services interface and a synchronous application; 2) an asynchronous web services interface and a synchronous application; 3) a synchronous web services interface and an asynchronous application; and 4) an asynchronous web services interface and an asynchronous application. It should be noted that the web services system 200 can simultaneously support different combinations of synchrony. For example, the combination of application 225 and web services layer 220 could be a synchronous web services interface and a synchronous application, while the combination of application 230 and web services layer 220 could be an asynchronous web services interface and an asynchronous application.

In an embodiment of the invention, a synchronous web services interface and a synchronous application are integrated as follows. An application developer implements and annotates a synchronous application API. An annotation can describe various aspects of the application API, including the type of synchrony (e.g. synchronous or asynchronous) it supports. Table 1 illustrates an example synchronous application API.

TABLE 1

Example Synchronous Application API

PatientInfo getPatient(PatientRequest req) throws PatientException;
void putPatient(PatientInfo req) throws PatientException;

In this example API, all data types associated with the application have a prefix of "Patient." This includes the data types of "PatientInfo" and "PatientRequest." The example API includes two functions: "getPatient," which requires an input of type "PatientRequest" and returns a result of type "PatientInfo;" and "putPatient," which requires an input of type "PatientInfo."

In an embodiment, application APIs are published in an interface directory, such as Oracle's Interface Repository (IRep) or a UDDI directory. A system administrator can select all or a portion of an application's API from a user interface of the interface directory and automatically generate either a synchronous or asynchronous web services interface. In an embodiment, the web services interface is specified using a Web Services Description Layer (WSDL) formatted document. In an embodiment, a WSDL formatted document is generated from the description of an application API in the interface directory, such as IRep or UDDI. Table 2 illustrates a portion of an example WSDL document for a synchronous web services interface corresponding with the example Synchronous API of Table 1.

TABLE 2

Example Synchronous Web Services Interface

```
<definitions xmlns:patient="patientURI" ... >
    <types ...>
        <xsd:element name="getPatient"
        type="patient:patientRequest" />
        <xsd:element name="getPatientResponse"
        type="patient:patientInfo" />
        <xsd:element name="putPatient" type="patient:patientInfo" />
        ...
        <!- product team provided xml types →
        <xsd:element name="patientRequest" .. >
        <xsd:element name="patientInfo" .. >
    </types>
    <message name="getPatientInput>
        <part name="body" element="patient:getPatient">
        <part name="header" ... >
    </message>
    <message name="getPatientOutput>
        <part name="body" element="patient:getPatientResponse">
    </message>
    <message name="putPatientInput>
        <part name="body" element="patient:putPatient">
        <part name="header" ... >
    </message>
    <portType name="PatientModule">
        <operation name="getPatient">
            <input message="patient:getPatientInput" />
            <output message="patient: getPatientOutput" />
            <fault message="patient:PatientFault" />
        </operation>
        <operation name="putPatient">
            <input message="patient: putPatientInput" />
            <fault message="patient:PatientFault" />
        </operation>
    </portType>
    ...
</definitions >
```

In this example synchronous web services interface, data types corresponding with the "PatientInfo" and "PatientRequest" data types in the application API are defined in the "<types>" section. The "<portType>" section defines operations corresponding with the "getPatient" and "putPatient" functions of the application API. These operations can include two-way or one-way messages, depending upon whether the corresponding API function returns data results or nothing, respectively.

In an embodiment, a naming convention is used to define the names of the data types and operations in the web services interface corresponding with data types and functions in the application API. For example, a naming convention can assign the same name to operations and data types in the web services layer as given to the corresponding functions and data types in the application API. In other examples, naming conventions can be more complex to account for reserved words, illegal characters, and formatting requirements in the web services interface.

In an embodiment, each of these data types and operations in the web services interface are preceded by a "patient:" prefix. This prefix defines a "patient" namespace that is unique to the example application API. If another application is included in the web services system, its data types and functions are associated with a different namespace. In this embodiment, a web services request includes a reference to the namespace associated with the underlying application providing the requested operations.

Using the namespace included with the web services request, the web services layer identifies the application used to perform the requested operation. In a further embodiment, the web services layer uses the naming convention to identify one or more functions in the API corresponding the web services request. The web services layer further uses the naming convention to identify any function arguments and/or data results for the API functions from the data types in the web services request. Once an application API function and its arguments are identified from the web services request, the web services layer can invoke the function. A similar process is applied to format and return data results to the client.

In an embodiment of the invention, synchronous and asynchronous web services interfaces and an asynchronous application are integrated as follows. An application developer implements and annotates an asynchronous application API, as described above. Table 3 illustrates an example asynchronous application API.

TABLE 3

Example Asynchronous Application API

Token getPatient_Async(PatientRequest req) throws PatientException;
PatientInfo get_getPatient_Async(Token id) throws PatientException;

In this example API, some data types associated with the application have a prefix of "Patient." This includes the data type of "PatientRequest." In an embodiment, other data types, such as the Token, do not have this prefix. An embodiment of the web services system requires all asynchronous applications to use a generic, rather than application-specific, token data type. As discussed in detail below, this allows for the web services layer to use a different namespace for handling tokens, improving the efficiency of the web services interface when translating between different types of synchrony. The example asynchronous API includes two functions: "getPatient_Async," which requires an input of type "PatientRequest" and returns a result of type "Token;" and "get_getPatient_Async," which requires and input of type "Token" and returns a result of type "PatientInfo."

In an embodiment, application APIs are published in an interface directory, such as Oracle's Interface Repository (IRep) or a UDDI directory. A system administrator can select all or a portion of an application's API from a user interface of the interface directory and the web services interface generator will automatically create either a synchronous or asynchronous web services interface. In an embodiment, the web services interface is specified using a Web Services Description Layer (WSDL) formatted document. As discussed above, this WSDL formatted document can be generated from the application API description in an IRep, UDDI, or other interface directory.

Combining an asynchronous web services interface with an asynchronous application API is wasteful. If an asynchronous web services interface and an asynchronous application API were combined, the combined interface would be doubly asynchronous. The web services layer would generate a first token in response to a web services request. The application API would forward a second token to the web services API in response to a function invocation. The web services layer would then have to associate the first and second tokens together, so that when the client presents the first token to the web services layer, the web services layer will present the second token to the application API to retrieve data results. To avoid this inefficiency, an embodiment of the web service interface generator will always present synchronous web services interface for applications having an asynchronous API. In this embodiment, the web services layer passes tokens from the application API to the client, rather than generating its own token and matching these with tokens from the application API.

Using the namespaces included with the web services request, the web services layer identifies the application used to perform the requested operation. In a further embodiment, the web services layer uses the naming convention to identify one or more functions in the API corresponding the web

TABLE 4

Example Web Services Interface for an Asynchronous Application API

```
<definitions name="BusinessLogics>
    <types ...>
            <xsd:element name="getPatient_Async" type="patient:patientRequest" />
            <xsd:element name=" getPatient_AsyncResponse" type="ws:Token" />
            <xsd:element name="get_getPatient_Async" type="ws:Token" />
            <xsd:element name="get_getPatient_AsyncResponse" type="patient:patientInfo" />
            ...
            <!- product team provided xml types →
        <xsd:element name="patientRequest" .. >
            <xsd:element name="patientInfo" .. >
        <!- web services provided xml types →
            <xsd:element name="Token" .. >
    </types>
    <message name=" getPatient_Async_Input ">
            <part name="body" element="patient:getPatient_Async">
            <part name="header" ... >
    </message>
    <message name=" getPatient_ Async_Output">
            <part name="body" element="patient:getPatient_AsyncResponse">
    </message>
    <message name=" get_getPatient_Async_Input>
            <part name="body" element="patient: get_getPatient_Async">
            <part name="header" ... >
    </message>
    <message name=" get_getPatient_Async_Output>
            <part name="body" element="patient: get_getPatient_AsyncResponse">
    </message>
    <portType name="PatientModule">
        <operation name="getPatient_Async">
            <input message="patient:getPatient_Async_Input" />
            <output message="patient: getPatient_Async_Output" />
            <fault message="patient:PatientFault" />
        </operation>
        <operation name="get_getPatient_Async">
            <input message="patient: get_getPatient_Async_Input" />
            <output message="patient: get_getPatient_Async_Output" />
            <fault message="patient:PatientFault" />
            </operation>
    </portType>
    ...
</definitions >
```

Table 4 illustrates a portion of an example WSDL document for a synchronous web services interface corresponding with the example asynchronous API of Table 3. In this example synchronous web services interface, data types corresponding with the "Token," "PatientInfo," and "PatientRequest" data types in the application API are defined in the "<types>" section. The "<portType>" section defines operations corresponding with the "getPatient_Async" and "get_getPatient_Async" functions of the application API. These operations return data of type "Token" and of type "PatientInfo," respectively.

In an embodiment, a naming convention is used to define the names of the data types and operations in the web services interface corresponding with data types and functions in the application API. In an embodiment, some of the data types and operations in the web services interface are preceded by a "patient:" prefix. This prefix defines a "patient" namespace that is unique to the example application API. In this embodiment, a web services request includes a reference to the namespace associated with the underlying application providing the requested operations. Additionally, some data types, such as the "Token" data type, are associated with a "ws" namespace associated with the web services layer.

services request. The web services layer further uses the naming convention to identify any function arguments and/or data results for the API functions from the data types in the web services request. Because tokens having the "Token" data type are associated with the "ws" namespace, not the "patient" namespace associated with the application, the web services layer can have one general routine for handling tokens, rather than separate routines for each of a number of different asynchronous application APIs. As discussed above, an embodiment of the web services layer passes tokens between applications and clients unchanged, avoiding the wasteful generation and processing of extra tokens by the web services layer. Once an application API function and its arguments are identified from the web services request, the web services layer can invoke the function. A similar process is applied to format and return data results to the client.

Typically, many older applications and non-web services clients use an asynchronous API to communicate. In contrast, typical web services clients and newer applications tend to prefer synchronous communications. Nonetheless, as many enterprises upgrade to newer synchronous applications, they may still need to support older asynchronous clients via a web services interface. To address this need, an embodiment of the invention integrates an asynchronous web services interface and an synchronous application. An application developer implements and annotates a synchronous application API, as described above. Table 5 illustrates an example synchronous application API.

TABLE 5

Example Synchronous Application API

PatientInfo getPatient(PatientRequest req) throws PatientException;
void putPatient(PatientInfo req) throws PatientException;

In this example API, data types associated with the application have a prefix of "Patient." This includes the data type of "PatientRequest." The example API includes two functions: "getPatient," which requires an input of type "PatientRequest" and returns a result of type "PatientInfo;" and "putPatient," which requires an input of type "PatientInfo."

In an embodiment, application APIs are published in an interface directory, such as Oracle's Interface Repository (IRep) or a UDDI directory. A system administrator can select all or a portion of an application's API from a user interface of the interface directory and the web services interface generator will automatically create either a synchronous or asynchronous web services interface. In an embodiment, the web services interface is specified using a Web Services Description Layer (WSDL) formatted document.

TABLE 6

Example Web Services Interface for an Asynchronous Application API

```
<definitions xmlns:patient="patientURI" ... >
    <types ...>
        <xsd:element name="getPatient" type="patient:patientRequest" />
        <xsd:element name="getPatientResponse" type="patient:patientInfo" />
        ...
        <!-ws improvised xml types !→
        <xsd:schema ... targetNamespace="...ws... "
            xmlns:patient="... patient... " ...>
            <xsd:element name=" getPatient_WsAsync" type="patient: patientRequest" />
            <xsd:element name=" getPatient_WsAsyncResponse" type="ws:Token" />
            <xsd:element name=" get_getPatient_WsAsync" type="ws:Token" />
            <xsd:element name=" get_getPatient_WsAsyncResponse" type="patient:patientInfo" />
        </xsd:schema>
        ...
        <!- product team provided xml types →
        <xsd:element name="patientRequest" .. >
        <xsd:element name="patientInfo" .. >
    </types>
    <message name="getPatientInput>
        <part name="body" element="patient:getPatient">
        <part name="header" ... >
    </message>
    <message name="getPatientOutput>
        <part name="body" element="patient:getPatientResponse">
    </message>
    <message name="getPatient_WsAsyncInput >
        <part name="body" element="ws:getPatient_WsAsync">
        <part name="header" ... >
    </message>
    <message name="getPatient_WsAsyncOutput >
        <part name="body" element="ws:getPatient_WsAsyncResponse">
    </message>
    <message name="get_getPatient_WsAsyncInput >
        <part name="body" element="ws:get_getPatient_WsAsync">
        <part name="header" ... >
    </message>
    <message name="ws:get_getPatient_WsAsyncOutput >
        <part name="body" element="ws:get_getPatient_WsAsyncResponse">
    </message>
    <portType name="PatientModule">
        <operation name="getPatient">
            <input message="patient:getPatientInput" />
            <output message="patient: getPatientOutput" />
            <fault message="patient:patientFault" />
        </operation>
        <operation name="getPatient_WsAsync">
            <input message="patient: getPatient_WsAsyncInput" />
            <output message="patient:getPatient_WsAsyncOutput" />
            <fault message="patient:paintFault" />
        </operation>
        <operation name="get_getPatient_WsAsync">
            <input message="patient:get_getPatient_WsAsyncInput" />
            <output message="patient:get_getPatient_WsAsyncOutput" />
            <fault message="patient:paientFault" />
        </operation>
    </portType>
    ...
</definitions >
```

Table 6 illustrates a portion of an example WSDL document for an asynchronous web services interface corresponding with the example synchronous API of Table 5. In this example asynchronous web services interface, data types corresponding with the "PatientInfo," and "PatientRequest" data types in the application API are defined in the "<types>" section. Additionally, a "Token" data type is defined as above in the "ws" namespace. As discussed above, an embodiment uses a naming convention to define the names of the data types and operations in the web services interface corresponding with data types and functions in the application API. This includes one or more asynchronous web services operations corresponding with a function of the application API.

To supply an asynchronous interface, the "<types>" and "<portType>" sections define a set of asynchronous web services operations, such as "getPatient_WsAsync" and "get_getPatient_WsAsynch." These operations are associated with the "patient" namespace. These operations use data of type "Token" in the "ws" namespace, either for a return value or an argument. In the example of Table 6, these operations are listed in bold for clarity.

The web services layer uses the namespace associated with an asynchronous web services operation to identify an application API providing a corresponding synchronous function. In an embodiment, these asynchronous web services operations, though defined in the WSDL document, are not directly implemented by either the application API or the web services layer. Because the asynchronous web services operations depend on a "Token" data type in the "ws" namespace, which is associated with the web services layer rather than a specific application; asynchronous web services operations are automatically diverted to a general web services routine to resolve this reference. In an embodiment, this general web service routine can be implemented as a stub routine.

To implement asynchronous web services operations, an embodiment of the general web services routine follows a method similar to method 400. The general web services routine uses the naming convention and the namespace associated with the asynchronous web services operation request to identify a corresponding synchronous API function. The general web services routine stores the asynchronous web services request in a queue, buffer, or other data structure associated with the web services layer. The general web services routine returns a token to the client. The token indicates the stored location of the web services request. Additionally, the general web services routine invokes the corresponding synchronous API function. In an embodiment, the web services layer automatically passes any data results from the application back to the client.

In another embodiment, any data results from the synchronous API function are stored in the same or equivalent location as the corresponding web services request. When the client application presents the token to web services layer using another asynchronous web services operation request, the use of the "ws" namespace for the token enables this request to be intercepted by the general web services routine. The general web services routine retrieves data results from the location indicated by the token and returns them to the client. Because tokens having the "Token" data type are associated with the "ws" namespace, not the namespace associated with the application, such as "patient," the web services layer can have one general routine for handling all asynchronous web services operations corresponding to synchronous API functions, rather than separate routines for each of a number of different synchronous application API functions.

Figure 5:
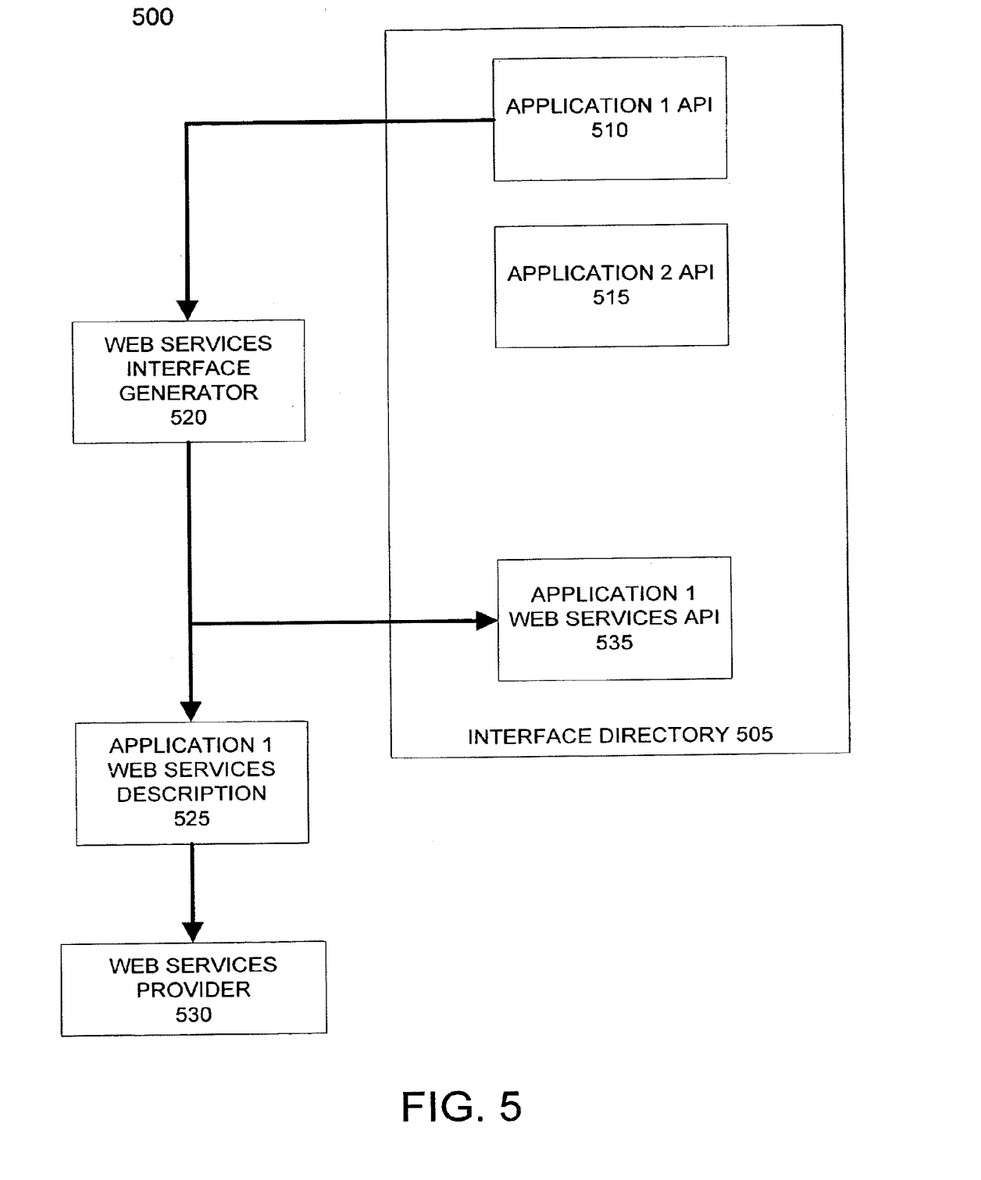
FIG. 5 is a block diagram illustrating the operation of a web services interface generator according to an embodiment of the invention.

FIG. 5 is a block diagram 500 illustrating the operation of a web services interface generator according to an embodiment of the invention. As discussed above, an embodiment of the web services system publishes application APIs in an interface directory 505, such as Oracle's Interface Repository (IRep) or a UDDI directory. Interface directory 505 includes specifications for Application 1 API, 510, and Application 2, API, 515. The specifications for APIs 510 and 515 include a listing of application API functions, function arguments and return values, and other attributes, such as the type of synchrony supported by the application API.

A web services interface generator 520 is interfaced with the interface directory 505. Using the web services interface generator 520, a system administrator can select all or a portion of an application API, such as the Application 1 API 510. Additionally, the system administrator can specify one or more desired types of synchrony (e.g. synchronous or asynchronous) to be used in a web services interface corresponding with the selected application API.

Based upon the attributes of the selected application API and the desired type of synchrony for the web services interface, the web services interface generator 520 will automatically create a web services interface description 525 corresponding to the selected application API. In an embodiment, the web services interface description 525 is specified using a Web Services Description Layer (WSDL) formatted document or any other type of data format used to specify web services. In an embodiment, if the system administrator specifies multiple types of synchrony for the web services interface, the web services interface description 525 will include operations for both types of synchrony. In an embodiment, the web services interface generator 520 creates the web services interface description 525 using one or more WSDL templates adapted to convert the specification of the selected application API in the interface directory 505 to a WSDL-formatted document. In general, the WSDL templates are adapted to create WSDL-formatted documents similar to the example WSDL interfaces described above, based upon the combination of application API and web services interface synchrony.

The web services interface generator 520 transfers a copy of the web services interface description 525 to a web services provider 530. The web services provider 530 includes a web services layer as discussed above. In an embodiment, the web services provider uses the namespaces and naming conventions associated with the web services interface description to match web services operations with corresponding application API functions, as described above. In a further embodiment, a specification 530 corresponding to the web services interface description 525 is added to the interface directory 505, so that web services application are notified of this newly web services interface. In an, additional embodiment, the web services provider 530 checks the interface directory 505 for this specification when a web services operation request is received to ensure that the application and its web services interface are still available.

Although the invention has been discussed with respect to specific embodiments thereof, these embodiments are merely illustrative, and not restrictive, of the invention. For example, rather than generating separate web services interfaces for synchronous and asynchronous web services client, an alternate embodiment of the invention can utilize a single web services interface for any type of client. In this embodiment, the web services interface includes an additional parameter that clients can use to specify whether the web services interface should behave in a synchronous or asynchronous manner in response to a web services request. Thus, the scope of the invention is to be determined solely by the claims.

What is claimed is:

1. A computer implemented method of generating a web services description document for a non-web services capable application programming interface function of an application, the method comprising:
- identifying, by a computer system, at least one function of a non-web services capable application programming interface and at least one function parameter;
- identifying, by the computer system, a type of synchrony associated with the function;
- identifying, by the computer system, desired types of synchrony for corresponding web services requests for said function, wherein the desired types of synchrony can include more than one type of synchrony;
- determining, by the computer system, a namespace corresponding to the application from the name of the function of the application programming interface;
- determining, by the computer system, a name of the corresponding web services request;
- determining, by the computer system, a system namespace for processing responses to asynchronous web services requests, wherein the system namespace is associated with a general services routine of a translation layer and is different from the namespace corresponding to the application; and
- generating, by the computer system, a web services description document including a type section associating the name of the corresponding web services request with the namespace, a message section associating the function parameter with a web services message, and a port section associating the web services message with a corresponding web services request, wherein the web services description document contains operations for all the identified types of synchrony corresponding to the function, wherein the web services description document further indicates that a response to the asynchronous web services request are obtained from the general services routine such that a token associated with the system namespace diverts the asynchronous web services request to the general processing routine of the translation layer.

2. The method of claim 1, wherein the type section includes an association of the function parameter and the namespace.

3. The method of claim 1, wherein in response to the type of synchrony of the application being synchronous and the desired type of synchrony being asynchronous, the type section includes an association of the function parameter and an alternate namespace associated with a web services layer.

4. The method of claim 1, wherein the name of the corresponding web services request is determined from a name of the function using a naming convention.

5. The method of claim 1, wherein the web services message is an input to a web services request.

6. The method of claim 1, wherein the web services message is an output of web services request.

7. A non-transitory computer readable medium embodying a set of instructions to direct a computer to perform an operation comprising:
- identifying at least one function of a non-web services capable application programming interface and at least one function parameter;
- identifying a type of synchrony associated with the function;
- identifying desired types of synchrony for corresponding web services requests for said function, wherein the desired types of synchrony can include more than one type of synchrony;
- determining a namespace corresponding to the application from the name of the function of the application programming interface;
- determining a name of the corresponding web services request;
- determining, by the computer system, a system namespace for processing responses to asynchronous web services requests, wherein the system namespace is associated with a general services routine of a translation layer and is different from the namespace corresponding to the application; and
- generating a web services description document including a type section associating the name of the corresponding web services request with the namespace, a message section associating the function parameter with a web services message, and a port section associating the web services message with a corresponding web services request, wherein the web services description document contains operations for all the identified types of synchrony corresponding to the function, wherein the web services description document further indicates that a response to the asynchronous web services request are obtained from the general services routine such that a token associated with the system namespace diverts the asynchronous web services request to the general processing routine of the translation layer.

8. The non-transitory computer readable medium of claim 7, wherein the type section includes an association of the function parameter and the namespace.

9. The non-transitory computer readable medium of claim 7, wherein in response to the type of synchrony of the application being synchronous and the desired type of synchrony being asynchronous, the type section includes an association of the function parameter and an alternate namespace associated with a web services layer.

10. The non-transitory computer readable medium of claim 7, wherein the name of the corresponding web services request is determined from a name of the function using a naming convention.

11. The non-transitory computer readable medium of claim 7, wherein the web services message is an input to a web services request.

12. The non-transitory computer readable medium of claim 7, wherein the web services message is an output of web services request.

13. A system configured to generate a web services description document for a non-web services capable application programming interface function of an application, the system comprising:
- a processor; and
- a memory storing a set of instructions that configure the processor to:
  - identify at least one function of a non-web services capable application programming interface and at least one function parameter;
  - identify a type of synchrony associated with the function;
  - identify desired types of synchrony for corresponding web services requests for said function, wherein the desired types of synchrony can include more than one type of synchrony;
  - determine a namespace corresponding to the application from the name of the function of the application programming interface;
  - determine a name of the corresponding web services request;
  - determine a system namespace for processing responses to asynchronous web services requests, wherein the system namespace is associated with a general services routine of a translation layer and is different from the namespace corresponding to the application; and generate a web services description document including a type section associating the name of the corresponding web services request with the namespace, a message section associating the function parameter with a web services message, and a port section associating the web services message with a corresponding web services request, wherein the web services description document contains operations for all the identified types of synchrony corresponding to the function, wherein the web services description document further indicates that a response to the asynchronous web services request are obtained from the general services routine such that a token associated with the system namespace diverts the asynchronous web services request to the general processing routine of the translation layer.

14. The system of claim 13, wherein the type section includes an association of the function parameter and the namespace.

15. The system of claim 13, wherein in response to the type of synchrony of the application being synchronous and the desired type of synchrony being asynchronous, the type section includes an association of the function parameter and an alternate namespace associated with a web services layer.

16. The system of claim 13, wherein the name of the corresponding web services request is determined from a name of the function using a naming convention.

17. The system of claim 13, wherein the web services message is an input to a web services request.

18. The system of claim 13, wherein the web services message is an output of web services request.

* * * * *

UNITED STATES PATENT AND TRADEMARK OFFICE
CERTIFICATE OF CORRECTION

PATENT NO. : 8,443,380 B2  
APPLICATION NO. : 13/052040  
DATED : May 14, 2013  
INVENTOR(S) : Xie et al.

Page 1 of 1

It is certified that error appears in the above-identified patent and that said Letters Patent is hereby corrected as shown below:

In the Specification:

In column 7, table 2, line 15, delete " ⟶ " and insert -- ·· ⟩ --, therefor.

In column 9-10, table 4, line 15, delete " ⟶ " and insert -- ·· ⟩ --, therefor.

In column 9-10, table 4, line 18, delete " ⟶ " and insert -- ·· ⟩ --, therefor.

In column 11, line 3, delete "an" and insert -- a --, therefor.

In column 11-12, table 6, line 22, delete " ⟶ " and insert -- ·· ⟩ --, therefor.

In column 11-12, table 6, line 31, delete " ⟶ " and insert -- ·· ⟩ --, therefor.

In column 11-12, table 6, line 65, delete "patient:paintFault" and insert -- patient:patientFault --, therefor.

In column 11-12, line 70, delete "patient:paientFault" and insert -- patient:patientFault --, therefor.

In column 13, line 17, delete "WsAsynch." and insert -- WsAsync. --, therefor.

In column 14, line 51, delete "an," and insert -- an --, therefor.

Signed and Sealed this  
Seventeenth Day of September, 2013

Teresa Stanek Rea  
*Deputy Director of the United States Patent and Trademark Office*